(12) United States Patent
van der Eerden et al.

(10) Patent No.: US 9,044,022 B2
(45) Date of Patent: Jun. 2, 2015

(54) TWIN SPRIAL OVEN

(75) Inventors: Hendricus Franciscus Jacobus Maria van der Eerden, Gemert (NL); Jeroen Robert Willemsen, Veenendaal (NL); Johannes Martinus Meulendijks, Deurne (NL)

(73) Assignee: MAREL TOWNSEND FURTHER PROCESSING B.V., Boxmeer (NL)

(*) Notice: Subject to any disclaimer, the term of this patent is extended or adjusted under 35 U.S.C. 154(b) by 725 days.

(21) Appl. No.: 12/809,227

(22) PCT Filed: Dec. 23, 2008

(86) PCT No.: PCT/NL2008/000287
§ 371 (c)(1),
(2), (4) Date: Jun. 18, 2010

(87) PCT Pub. No.: WO2009/084949
PCT Pub. Date: Jul. 9, 2009

(65) Prior Publication Data
US 2011/0226137 A1    Sep. 22, 2011

(30) Foreign Application Priority Data

Dec. 28, 2007  (NL) .................................... 2001142

(51) Int. Cl.
*A47J 37/04* (2006.01)
*A21B 1/48* (2006.01)
*F25D 13/06* (2006.01)

(52) U.S. Cl.
CPC ................. *A21B 1/48* (2013.01); *F25D 13/067* (2013.01)

(58) Field of Classification Search
USPC ........ 219/388, 400, 401; 99/443 C, 475–477, 99/479, 517; 126/15 R, 19 R, 30, 30.1, 126/21 A, 21 R
See application file for complete search history.

(56) References Cited

U.S. PATENT DOCUMENTS

| | | | |
|---|---|---|---|
| 4,944,162 A * | 7/1990 | Lang et al. | 62/380 |
| 4,965,435 A | 10/1990 | Smith et al. | |
| 5,078,920 A * | 1/1992 | Maza | 549/413 |
| 5,205,135 A | 4/1993 | Lang | |
| 5,329,916 A * | 7/1994 | Lygum | 126/21 A |

(Continued)

FOREIGN PATENT DOCUMENTS

| EP | 0 953 286 A1 | 11/1999 |
|---|---|---|
| EP | 1 437 076 A2 | 7/2004 |

(Continued)

*Primary Examiner* — Brian Jennison
(74) *Attorney, Agent, or Firm* — Birch, Stewart, Kolasch & Birch, LLP

(57) ABSTRACT

The invention relates to a treatment device for treating food products using conditioned treatment fluid, comprising a housing (10), which defines a treatment space (18) and is provided with an inlet (12) for introducing products to be treated into the treatment space, and an outlet (14) for discharging treated products from the treatment space, with the treatment space (18) being in open communication with the environment, a conveying means (16, 20) for conveying the food products from the inlet through the treatment space to the outlet, with the conveying means (16; 20) between the inlet and outlet following a helical conveying path (26) comprising several turns one above the other, circulation means (40) for circulating treatment fluid through the treatment space, conditioning means (56; 57) for conditioning the treatment fluid.

8 Claims, 2 Drawing Sheets

(56) References Cited

U.S. PATENT DOCUMENTS

| | | | |
|---|---|---|---|
| 6,658,993 B2 * | 12/2003 | Kuenen | 99/446 |
| 2002/0029698 A1 * | 3/2002 | van de Vorst et al. | 99/477 |
| 2002/0031582 A1 * | 3/2002 | Perrine | 426/467 |
| 2005/0092312 A1 | 5/2005 | Gunawardena et al. | |

FOREIGN PATENT DOCUMENTS

| | | |
|---|---|---|
| EP | 1 797 758 A2 | 6/2007 |
| GB | 903 899 A | 8/1962 |
| GB | 2 055 460 A | 3/1981 |
| JP | 3-286983 A | 12/1991 |

* cited by examiner

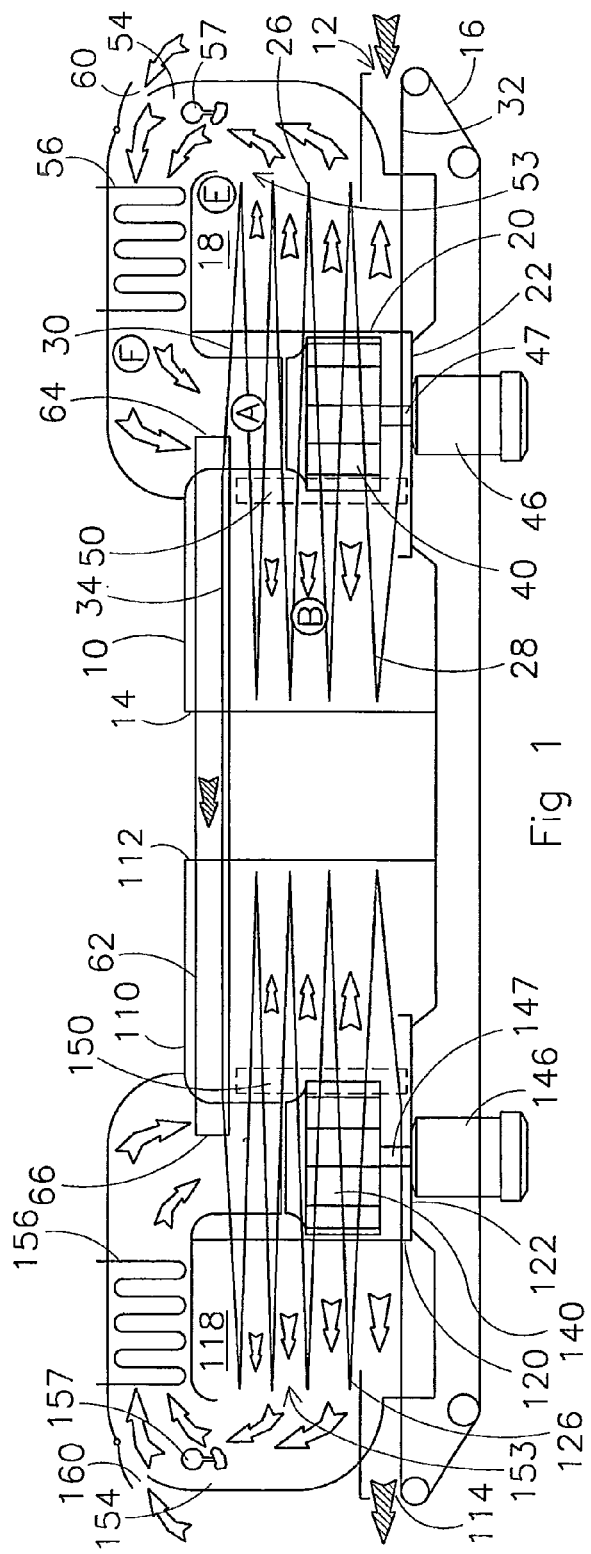
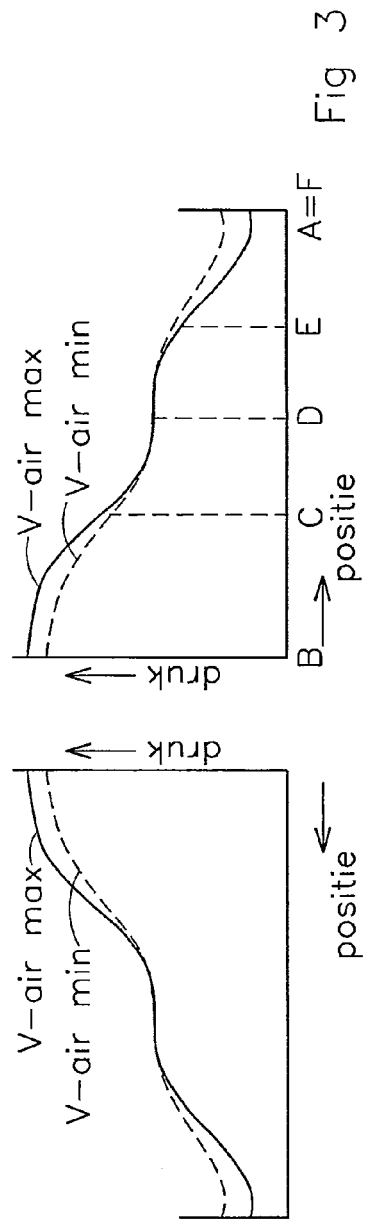

TWIN SPRIAL OVEN

The present invention, according to a first aspect, relates to a treatment device for treating food products using conditioned treatment fluid, in particular for mass production, more particularly an oven for treating food products using conditioned treatment fluid.

A treatment device for treating food products using conditioned treatment fluid which can be operated as an oven is known, for example, from European patent application 0 953 286 in the name of the Applicant. This known device comprises a housing in which a conveying means is arranged for conveying the products through the housing from an inlet to an outlet along a helical conveying path. The conveying means comprises a hollow drum which is substantially composed of horizontal and vertical strips and is arranged so as to be rotatable about a vertical shaft. The conveying means furthermore comprises an endless conveyor belt which travels along a helical path during operation. Conditioned treatment fluid is able to flow between the strips of the drum over the turns of the conveyor belt. Furthermore, air-conditioning means for conditioning the air stream, for example the temperature and/or moisture content thereof, and air-circulation means for circulating the conditioned treatment fluid through the housing are present.

In the field, so-called twin spiral ovens are known which are provided with two or more treatment spaces in one and the same housing, each having its own conditioning means and circulation means. Such a construction makes it possible to carry out different treatment processes in the treatment spaces, for example at different temperatures. The treatment spaces may be separated from one another by means of, for example, a partition or air curtain.

In the field, installations are also known which comprise two or more separate treatment devices each having their own housing, conditioning means and circulation means. Between the two housings, a connecting duct may be provided in order to limit the effects of the environment on the products.

For example, US 2005/0092312 A1 discloses a continuous oven system with a linear conveying means which comprises an indirectly and a directly heated treatment space. In one embodiment thereof, the spaces are connected to one another by means of a tunnel, through which a conveying means runs. In another embodiment, the spaces are separated by a partition. Additional measures, such as a mechanical sealing or a steam curtain may be used to separate the climates of the respective treatment spaces from one another.

Measures are also known for limiting the exchange of conditioned treatment fluid from a treatment space with ambient air at the inlet and outlet, respectively. Thus, EP-A2-1797758 generally describes that the inlet and outlet openings of the continuous oven system disclosed in this publication are kept as small as possible, as are the passage openings between zones with different climates. In addition, stacks are provided at the inlet and outlet to regulate the influx and discharge of air.

Preventing or limiting the exchange of conditioned treatment fluid and ambient air or differently conditioned treatment fluid from another treatment space is particularly relevant with treatment devices and systems in which the treatment fluid circulates through the respective treatment space or spaces, in particular when a relatively high circulation speed or large difference in the speeds in various treatment spaces for the treatments to be carried out is desired.

Stacks are also used in order to compensate for any disturbances in the balance of the treatment fluid as a result of, for example, moisture emerging from or moisture being absorbed by the product, feeding in steam or changes in volume.

It is an object of the invention to provide a treatment device using circulating treatment fluid, in which disturbances in the stability of the balance of the treatment fluid in the treatment space caused by the circulation means is prevented. More particularly, it is an object of the invention to limit and/or prevent an exchange of conditioned treatment fluid and the environment, whether that is the surrounding space or an upstream or downstream treatment space, in a relatively simple manner, or to provide a usable alternative.

To this end, the treatment device for treating food products using conditioned treatment fluid according to the invention includes a housing, which defines a treatment space and is provided with an inlet for introducing products to be treated into the treatment space, and an outlet for discharging treated products from the treatment space, with the treatment space being in open communication with the environment, a conveying means for conveying the food products from the inlet through the treatment space to the outlet, with the conveying means between the inlet and outlet following a helical conveying path comprising several turns one above the other, circulation means for circulating treatment fluid through the treatment space, conditioning means for conditioning the treatment fluid, with at least one of the inlet and outlet comprising a duct extending through the housing and being positioned in such a manner that, during operation, there is essentially no pressure difference between an end of the duct in the treatment space and an end of the duct outside the housing.

The treatment device according to the invention comprises a housing having an inlet and an outlet for introducing products to be treated and discharging treated products, respectively. The housing delimits a treatment space or chamber which is in open communication with the environment via the inlet and/or outlet. In the treatment space, a conveying means is arranged which, between the inlet and outlet, follows a helical conveying path comprising several turns which are spaced apart one above the other. Near this inlet and outlet, the conveying path usually comprises straight sections which are relatively short compared to the overall length of the conveying path. The conveying means is designed to carry the food products. Furthermore, conditioning means are provided in the device according to the invention, which regulate conditions such as the temperature and/or moisture of the treatment fluid circulating in the treatment space. Circulation means ensure that the treatment fluid is circulated through the treatment space and preferably along the turns of the helical conveying path. According to the invention, the inlet and/or outlet, in particular the outlet, and more preferably both, are formed by a duct which extends through the housing, one end of which, also referred to as inner end below, is positioned in the treatment space and one end of which, also referred to as outer end below, is positioned outside the housing. The duct ends are positioned in such a manner that the pressure in the treatment space at this inner end is substantially equal to the pressure at the outer end. In other words, the pressure difference across the duct ends is negligible, so that there is no, or at least hardly any, flow of treatment fluid in the duct. Thus, there is no exchange between the climate of the treatment fluid present in the treatment space and another climate or the ambient atmosphere, even at a high speed of circulation. Thus, it is possible to maintain the climate of a treatment fluid circulating in the treatment space. The invention is based on the insight that for a given treatment device with associated arrangement of the circulation means with respect to the inlet and outlet, there will be a position(s) in the treatment space where the pressure is always substantially identical when circulating treatment fluid in the treatment space, irrespective of the circulation speed, at least virtually irrespective of the circulation speed. This (these) position(s) are situated in locations which differ from those where the inlet or outlet used to be positioned customarily. According to the invention, at least one of the inlet or outlet comprises a duct which extends through the housing. The inner end of the duct is located in a position where the pressure during operation is substantially identical to the pressure of the outer end, irrespective of the circulation speed.

In one preferred embodiment, the pressure at the inner end is substantially identical to the ambient pressure during operation (and therefore ambient pressure also prevails at the outer end). This preferred embodiment is mainly relevant for an independent single treatment device. As with such an arrangement according to the invention, there is hardly any pressure difference between the ambient pressure at the duct end which is on the outside of the housing and the inner end which is in the treatment space, the flow of treatment fluid and/or ambient air through the duct is relatively small or even zero. An exchange of conditioned treatment fluid and ambient air with all the associated negative consequences with regard to maintaining the desired climate in the treatment space is thus reduced to a minimum.

Without wishing to commit to any theory, a possible explanation is that the pressure, on the pressure side of the circulation means, which usually comprise a fan or pump, is higher than the atmospheric pressure and lower on the suction side thereof. The conditioned treatment fluid circulates from the pressure side of the circulation means through the treatment space to the suction side, with the pressure reducing over the course of the path traveled. At certain positions, which can be calculated and/or determined experimentally, the pressure is substantially identical to atmospheric pressure. Despite the fact that different circulation speeds are associated with differences in absolute pressure, both on the pressure side and on the suction side, these positions are substantially identical. Due to the measure according to the invention, the treatment device is suitable for use with a wide range of circulation speeds without disturbing influences of (ambient) air leaking to the inside or treatment fluid flowing out. In particular, the treatment device according to the invention is suitable for operation at higher (preferably >4 m/s) circulation speeds than have been customary with the treatment installations which are currently commercially available (3.5 m/s).

Advantageously, both the inlet and the outlet comprise a duct structure such as that described above.

The duct which is used according to the invention has dimensions, with the width being substantially determined by the conveying means used and the height being such that the highest products to be processed can pass. As treatment devices according to the invention are used for many different kinds of food products, each of which may be of a different size, in particular of a different height, the diameter of the duct is advantageously adjustable; preferably, the height is adjustable, so that the diameter can be made as small as possible for each kind of product to be treated.

The conveying means advantageously comprises at least one hollow drum which is rotatable about a vertical rotary shaft and which is driven during operation. Usually, the conveying means furthermore comprises an endless conveyor belt which is passed around one or more drums in accordance with the helical conveying path comprising a number of turns one above the other, and which is driven by (slip) friction with the drum(s). In addition, the circulation means are preferably designed to circulate treatment fluid via the hollow drum and along the turns through the treatment space. Conditioned treatment fluid thus flows from the circumference of the drum along the turns of the conveying path of the conveying means and across the products conveyed by the latter. The endless conveyor belt is moved along by friction between the inner edge thereof and the outer circumference of the drum or part thereof. The drive means, such as one or more electric motors, is preferably arranged outside the treatment space, i.e. outside the housing, in particular underneath the bottom thereof. The conveying means is preferably a (metal) mesh strip which is at least partially permeable to the conditioned treatment fluid.

With the treatment device according to the invention, the circulation means, viewed in the direction of flow of the conditioned treatment fluid, are advantageously arranged downstream of the conditioning means. In other words, the input side of the circulation means, such as the suction side of a fan, is either directly or indirectly, but advantageously directly, in fluid communication with the conditioning means, and the output side of the circulation means is, either directly or indirectly, in fluid communication with the circumference of the drum. In this way, it is possible, due to the turbulence generated in the circulation means, for the conditioned treatment fluid, which may, as a result of the configuration of the conditioning means have non-uniform properties, to be mixed downstream of the conditioning means and thus homogenized, so that any local deviations resulting from the conditioning of the treatment fluid are smoothed out. Thus, the circulation means have a double function, on the one hand circulating the conditioned treatment fluid and, on the other hand, mixing and thereby homogenizing the fluid conditioned in the conditioning means.

The conveying path in the treatment space comprises several turns which are one above the other. In top view, a turn may essentially have the shape of an ellipse, a polygon, such as a triangle or a rectangle, with the respective drums being arranged at the end points or corners. A helical conveying path in which the endless conveyor belt is passed around a drum, with a turn essentially following a circle, is preferred.

In a further preferred embodiment, the circulation means are at least partly arranged in the hollow drum. Such an arrangement of the circulation means allows for a compact construction of the complete treatment device. Furthermore, this arrangement allows for an efficient circulation of the conditioned treatment fluid due to the central position of the circulation means in the conveying path, in particular a helical conveying path and thus for an effective treatment of the products. The conditioned treatment fluid which flows out of the circulation means is passed between the turns of the conveying path via the drum circumference which is permeable to treatment fluid and distributed in a uniform manner.

Preferably, the circulation means comprise a fan. The impeller thereof is advantageously arranged inside the hollow drum, while the drive mechanism, such as an electric motor, is usually situated outside the housing. Advantageously, the drive mechanism is situated underneath the bottom of the housing. Advantageously, the circulation means are at least partially arranged at the bottom of the hollow drum. According to a further preferred embodiment, the rotary shaft of the impeller coincides with the rotary shaft of the drum, so that the distance from impeller to the drum circumference is constant. According to another preferred embodiment, the impeller is eccentric with respect to the vertical rotary shaft of the drum. This is particularly advantageous if it is desired to allow the conditioned treatment fluid to flow out only over a circumferential section of the turns of the conveying path.

Advantageously, the treatment device is designed such that conditioned treatment fluid only flows out over a part of the inner circumference of all turns of the helical conveying path. This circumferential section may, for example, be 30-180°. Preferably, this portion covers an arc section of 90-110°. In a further embodiment, drum-guiding means are to this end arranged in the drum downstream of the circulation means for distributing conditioned treatment fluid across a circumferential section of the turns of the conveying path.

One embodiment of the drum-guiding means comprises a stationary tubular body having a vertical outflow opening which extends at least over the total height of the turns of the conveying path positioned between the air circulation means and the drum.

Due to the preferred position of the circulation means in the hollow drum itself, the conditioned treatment fluid has to be distributed across the drum circumference over a relatively short distance, in particular across the opening angle of the outflow opening of the tubular body and across the height thereof, in order to achieve as uniform an outflow of the conditioned treatment fluid from the drum circumference as possible, in particular said outflow opening. Such a distribution of the air over the drum circumference, in particular said entire outflow opening, contributes to an efficient flow of conditioned treatment fluid across the products which are situated on the conveying means. Furthermore, this distribution is important in order to prevent peaks with regard to the speed of conditioned treatment fluid at the positions where the products are situated and thus prevent local non-uniform conditions and damage of the product, e.g. of a coating thereof, and/or to prevent the occurrence of non-uniform colouring of the product. Preferably therefore, additional drum-guiding means are provided in the drum at a position downstream of the circulation means, preferably in the outflow opening of the tubular body. Advantageously, these additional drum-guiding means are designed such that, during operation, the conditioned treatment fluid flows in concurrent and countercurrent with respect to the direction of movement of the conveyor belt.

The drum-guiding means in the drum build up a resistance between the circulation means and the conveying means, on which the products are situated during treatment. A preferred embodiment of such drum-guiding means comprises a series of parallel guide profiles which are spaced apart and arranged vertically and thus delimit vertical ducts. These ducts advantageously have, viewed in (horizontal) cross section, a non-linear shape, so that the treatment fluid flowing out of the ducts undergoes a forced change of direction. The distribution of the conditioned treatment fluid takes place automatically in these ducts.

As already stated above, the circulation means can be arranged centrally in the drum. The air circulation means can also be eccentric with respect to the rotary shaft of the drum, so that there is a relatively large distance between the circulation means and the drum-guiding means. More preferably, the drum-guiding means are arranged diametrically with respect to the circulation means.

In an advantageous embodiment, the housing consists of a hood which can be moved upwards and a tray, with a water seal being provided between the two.

The kind of conditioning means depends on the type of treatment which is to be carried out in the device according to the invention. The treatment device can be used for freezing, drying and heating food products. In particular, the treatment device according to the invention is an oven for treating, for example (pre)cooking, baking, frying, grilling and/or browning, meat products, such as optionally breaded and/or marinated hamburgers, chicken portions and other shaped products. Other uses of the treatment device according to the invention comprise drying, steaming, pasteurizing and sterilizing food products of vegetable and/or animal origin. The food products may optionally be packaged. In a preferred embodiment of the treatment device according to the invention as an oven, in particular a spiral oven with a helical conveying path, the conditioning means comprise at least air-heating means, such as a heat exchanger (using thermal oil or electricity). Other examples of conditioning means comprise moisturizing means for supplying moisture to the circulating treatment fluid, such as steam-injecting means.

The conditioning means are advantageously arranged in a duct which has an inlet which is connected to the treatment space and an outlet which is connected to the circulation means. Preferably, the inlet is situated on the outer circumference of the conveying path and extends across the height of the turns of the conveying path. The duct advantageously extends up to the inner side of the upper side of the housing, more preferably of the above-mentioned cover.

With the treatment device according to the invention, the centre axes of the inlet and the outlet, viewed in top view, advantageously run tangentially with respect to the housing and parallel to one another, advantageously along the same line. The inlet for the treatment fluid to the conditioning means is advantageously arranged on the outer circumference of the helical conveying path, at a position 90° from the inlet (viewed in the direction of transport). Said circumferential section is arranged 180° from the inlet to the conditioning means.

The above-described principle of a negligible pressure difference between the duct ends at an inlet and/or outlet can be applied in a similar manner for coupling several treatment installations to one another via a connecting duct. According to a second aspect of the invention, an assembly of several treatment devices for treating food products with conditioned treatment fluids comprises a first treatment device and at least one additional treatment device, with the first treatment device comprising a first housing which defines a first treatment space and is provided with a first inlet for introducing products to be treated into the first treatment space, and a first outlet for discharging treated products from the first treatment space, with the first treatment space being in open communication with the environment, a first conveying means for conveying the food products from the first inlet through the first treatment space to the first outlet, with the first conveying means between the first inlet and first outlet following a first helical conveying path comprising several turns one above the other, first circulation means for circulating a first treatment fluid through the first treatment space, first conditioning means for conditioning the first treatment fluid, and with a second treatment device comprising a second housing which defines a second treatment space and is provided with a second inlet for introducing products to be treated into the second treatment space, and a second outlet for discharging treated products from the second treatment space, with the second treatment space being in open communication with the environment, a second conveying means for conveying the food products from the second inlet through the second treatment space to the second outlet, second conditioning means for conditioning the second treatment fluid, with either the first outlet of the first treatment device and the second inlet of the second treatment device, or the second outlet of the second treatment device and the first inlet of the first treatment device being connected to one another by a connecting duct which extends through the first and the second housing in such a manner that there is essentially no pressure difference between the end of the connecting duct in the first treatment space and the end of the connecting duct in the second treatment space during operation. In other words, in such a manner that the ends of the connecting duct are positioned in the first and second treatment space, respectively, at positions where the pressure in the first treatment space is substantially equal to the pressure in the second treatment space.

With this second aspect of the invention, the first and second treatment devices are connected to one another by means of a connecting duct through which a conveying means travels. The connecting duct protects the food products which have already been treated in one of the treatment devices against the ambient atmosphere. The connecting duct extends from the one treatment space as far as into the next treatment space, with the inlet and outlet (the duct ends) being situated at positions where the pressures during operation are essentially identical. Since substantially identical pressures prevail at the connecting duct ends, irrespective of any difference in circulation speed, there is no pressure difference and thus hardly any exchange between the different conditioned climates. Advantageously, said pressures at the connecting duct ends are substantially equal to the ambient pressure.

In a further preferred embodiment of the assembly according to the invention, the inlet and/or outlet of the overall combination are designed according to the first aspect according to the invention. Thus, the inlet and outlet of the first and second treatment device which are in open communication with the environment preferably each comprise a duct which extends through the respective housing, an inner end of which is positioned in the respective treatment space in such a manner that, during use, the pressure in the respective treatment space at the inner end is substantially equal to the ambient pressure.

Advantageously, at least one of the treatment devices, preferably all devices of the assembly, is designed in accordance with the above-described treatment device according to the first aspect of the invention.

The invention also provides a method for treating food products with a conditioned treatment fluid in a treatment device having a housing comprising the steps of conveying the food products from an inlet through a treatment space to the outlet along a helical conveying path comprising several turns one above the other, circulating a conditioned treatment fluid in the treatment space, with at least one of the inlet and outlet comprising a duct which extends through the housing, and with the method being carried out in such a manner that there is essentially no flow of fluids in the duct. As a result of this measure, the method can be carried out in a stable climate of the treatment fluid, with the disturbing influence of the circulation on the stability being reduced.

The invention is explained below with reference to the attached drawing, in which:

FIG. 1 shows a diagrammatic cross section of an embodiment of an assembly of treatment devices according to the invention;

FIG. 3 shows a graph of the pressure as a function of the conveying path traveled in an embodiment of an assembly according to the invention.

Figure 2:
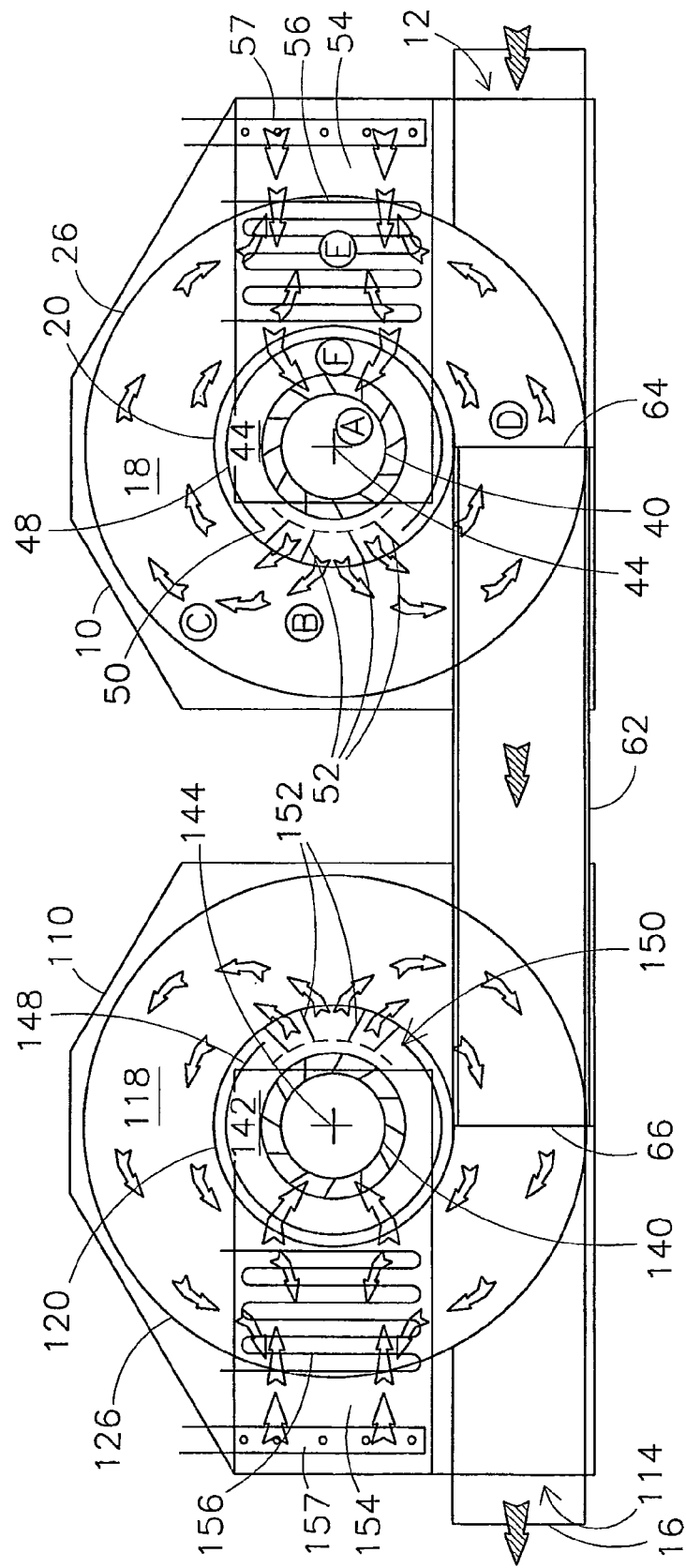
FIG. 2 shows a diagrammatic top view of an assembly from FIG. 1.

FIGS. 1 and 2 diagrammatically show an embodiment of an assembly according to the invention, in this case a combination of ovens. In this embodiment, a first treatment device comprises a first housing, which is denoted overall by reference numeral 10. The first housing 10 is provided with a first inlet 12 for introducing products to be treated and a first outlet 14 for discharging treated products. In the illustrated embodiment, a first conveying means comprises an endless conveyor belt 16 which is arranged in the first treatment space 18 delimited by the first housing 10. This first conveying means is moved along by a first hollow cylindrical drum 20 by (slip) friction which is driven by a motor (not shown). The endless conveyor belt 16 can be moved along a first helical conveying path 26 having a number of turns around the first drum 20 one above the other, which first conveying path 26 comprises straight sections 32, 34 at the bottom and top turns, respectively denoted by reference numerals 28 and 30. These straight track sections 32, 34 extend through the inlet 12, and outlet 14, respectively. In the illustrated embodiment, first circulation means 40 for circulating treatment fluid through the first treatment space 18—in this case the impeller of a fan—are arranged in the internal space 42 delimited by the drum 20 at a position concentric with respect to the vertical rotary shaft 44 of the drum 20. The motor 46 of the fan 40 with rotary shaft 47 is arranged underneath the bottom 22 of the first housing 10. A cylindrical body 48 with a vertical outflow opening 50 is placed between the circulation means 40 and the drum 20. In this outflow opening, drum-guiding means 52 in the form of spaced-apart substantially radially directed slats are provided which force the conditioned first treatment fluid to flow over a circumferential section of the drum 20. First treatment fluid which has been brought to the desired treatment conditions with regard to temperature and moisture content by first conditioning means 56, such as a heat exchanger, arranged in a duct 54, is sucked in by the first circulation means 40. Subsequently, this fluid, via the drum space 42, flows to the outflow opening 50 with the drum-guiding means 52 over the products (not shown) which are situated on the conveyor belt 16. Reference numeral 57 denotes a further conditioning means in the form of a steam inlet pipe for adjusting the moisture content of the treatment fluid.

As has been indicated by arrows in the top view of FIG. 2, the treatment fluid flows over the products in concurrent and countercurrent with respect to the direction of movement of the conveyor belt 16. Diametrically opposite the outflow opening 50, the fluid is collected at the outer circumference of the endless conveyor belt 16 and, via an inlet 53, passed into duct 54 which comprises a section which extends vertically upwards over the height of the turns and a section which is connected to the latter and extends horizontally. In this duct 54, an inlet 60 for the optionally controlled (for example using an actuated valve) introduction of ambient air is also provided.

The assembly comprises a second treatment device, which is of the same design as the first treatment device. Identical functional parts are denoted by the same reference numerals augmented by 100 and are not listed again here. The second treatment device 110 is mirror-symmetrical to the first treatment device 10 with respect to an imaginary dividing plane, at right angles to the centre axis of the first outlet 14. As is clear from the figure, the endless conveyor belt 16 also extends through the second treatment space 118 around the drum 120 to the outlet 114 thereof.

In the illustrated embodiment, a connecting duct 62 is provided between the first outlet 14 and the second inlet 112. The duct 62 extends through the housings 10 and 110, respectively. The ends 64, 66 of the connecting duct 62 are in the treatment spaces 18 and 118, respectively. As will be explained below in more detail, the duct 62 comprising the ends 64, 66 ends at positions in the treatment spaces 18, 118 where the local pressure is essentially independent of the circulation speed of treatment fluids in the treatment spaces. In this way, there is little pressure difference between the end 64 (duct inlet) and the end 66 (duct outlet), despite the fact that the circulation speeds in the treatment spaces may differ.

Due to the limited movement of the air inside it, the duct 62 forms a buffer between the treatment spaces 18 and 118 as it were. Thus, a stable climate prevails in each treatment space 18, 118 and in the assembly as a whole.

As will be clear from the above description, a treatment device according to the first aspect is effectively identical to the first treatment device, except that the end (66) of the (connecting) duct 60 does not end in another treatment space, but in the environment.

FIGS. 1 and 2 do not show that the inlet 12 of the first treatment device and/or the outlet 114 of the second treatment device is of a similar construction with a duct which extends from the outside (outer end) through the respective housing 10, 110 as far as into the associated treatment space 18 and 118, respectively.

FIGS. 1 and 2 furthermore denote the following positions in the flow path of the treatment fluid:
A=upstream of fan 40
B=downstream of fan 40
C=first position in conveying path
D=central position in conveying path
E=last position in conveying path
F=downstream of the conditioning means 56

Tests have been carried out using an embodiment of a treatment device according to the invention at different circulation speeds, in which the pressure was measured at the abovementioned positions. The results (rounded off) are summarized in Table 1.

TABLE 1

Pressure (Pa) compared to atmospheric pressure as a function of the position at different circulation speeds

| Position | v = 3 m/s | v = 5 m/s | v = 7 m/s |
| --- | --- | --- | --- |
| A | −850 | −1200 | −1600 |
| B | 200 | 250 | 300 |
| C | 25 | 40 | 60 |
| D | 0 | 0 | 0 |
| E | −50 | −70 | −80 |
| F (=A) | −850 | −1200 | −1600 |

As can be seen from the above table, in this embodiment the pressure at position D for the 3 different circulation speeds is zero, i.e. is equal to atmospheric pressure. Position D is thus the preferred position for the connecting duct to end in the assembly according to the invention.

FIG. 3 shows the course of pressures in the treatment spaces 18, 118 as a function of the position in the flow path of the respective treatment fluids. It is clear that the absolute value of the gradient at the positions D is small, so that there is no significant pressure difference across the duct and thus little flow, even when the connecting duct ends are not situated in their optimum positions.

Examples of processes for treating food products in two treatment devices with separated climates are described below. A climate is primarily characterized by three factors, i.e. dew point, temperature and circulation speed.

When processing bone-containing meat products covered with sauce, one of the two following climates is set in a first treatment device in order to cook the meat by increasing the core temperature:
a) climate with a high dew point which is equal to the process temperature, i.e. a relative humidity of 100%, and a circulation speed of at most 3 m/s; or
b) climate in which the process temperature is higher than the dew point, so that a relative humidity of 40% is achieved; the circulation speed is likewise at most 3 m/s.

In the second treatment device, significantly higher process temperatures and higher air speeds (range 2-7 m/s) are used in order to impart characteristics to the surface, such as colour. The dew point may vary.

When processing meat products which are treated with salt, the climates of the above process are reversed, so that the characteristics are imparted to the surface first in the first treatment device and the products are subsequently cooked in the second treatment device.

The invention claimed is:

1. A twin spiral oven for treating food products with conditioned treatment air streams, comprising:
   a first treatment device;
   a second treatment device,
   the first treatment device comprising:
      a first housing which defines a first treatment space and is provided with a first inlet for introducing products to be treated into the first treatment space, and a first outlet for discharging treated products from the first treatment space,
      a first fan for circulating a first treatment air stream through the first treatment space, the first fan adapted to allow for a variable circulation speed of said first treatment air stream within the first treatment space;
      a first air heater for conditioning the first treatment air stream, the first air heater heating the first treatment air stream,
   the second treatment device comprising:
      a second housing which defines a second treatment space and is provided with a second inlet for introducing products to be treated into the second treatment space, and a second outlet for discharging treated products from the second treatment space,
      a second fan for circulating a second treatment air stream fluid through the second treatment space, the second fan adapted to allow for a variable circulation speed of said second treatment air stream within the second treatment space; and
      a second air heater for conditioning a second treatment air stream, the second air heater heating said second treatment air stream;
   a connecting duct having a first end forming said first outlet of the first treatment device and a second end forming said second inlet of the second treatment device,
   an endless conveyor belt which extends through the first inlet of the first treatment device, followed by a first helical path with multiple turns above one another to the first end of the connecting duct, then through the connecting duct to the second end of the connecting duct, then followed by a second helical path with multiple turns above one another to the second outlet of the second treatment device, and then back to the first inlet of the first treatment device,
   wherein the connecting duct extends beyond the first housing and the second housing into the first treatment space and second treatment space, respectively, and
   wherein the first and second ends of the connecting duct are arranged at the position of the multiple turns of the first and second helical path, respectively, where a local air pressure is essentially independent from the circulation speed of the air stream in the treatment space caused by the fan, in such a manner that there is essentially no pressure difference between the first and second ends of the connecting duct during operation.

2. The twin spiral oven according to claim 1, in which the inlet of the first treatment device and outlet of the second treatment device, are each in open communication with the environment.

3. The twin spiral oven according to claim 1, wherein a diameter of the connecting duct is adjustable.

4. The twin spiral oven according to claim 3, wherein a height of the connecting duct is adjustable.

5. The twin spiral oven according to claim 1, in which the endless conveyor belt comprises a driven hollow drum and the first fan is adapted to circulate the first treatment air stream via the hollow drum over the turns through the first treatment space.

6. The twin spiral oven according to claim 5, wherein the first fan comprises an impeller arranged inside the hollow drum.

7. The twin spiral oven according to claim 5, wherein first drum-guiding means downstream of the first fan are arranged in the drum for distributing the conditioned first treatment air stream over a first circumferential section of the turns of the first helical path.

8. The twin spiral oven according to claim 1, wherein the first and second ends of the connecting duct are spaced apart by side walls.

* * * * *